UNITED STATES PATENT OFFICE.

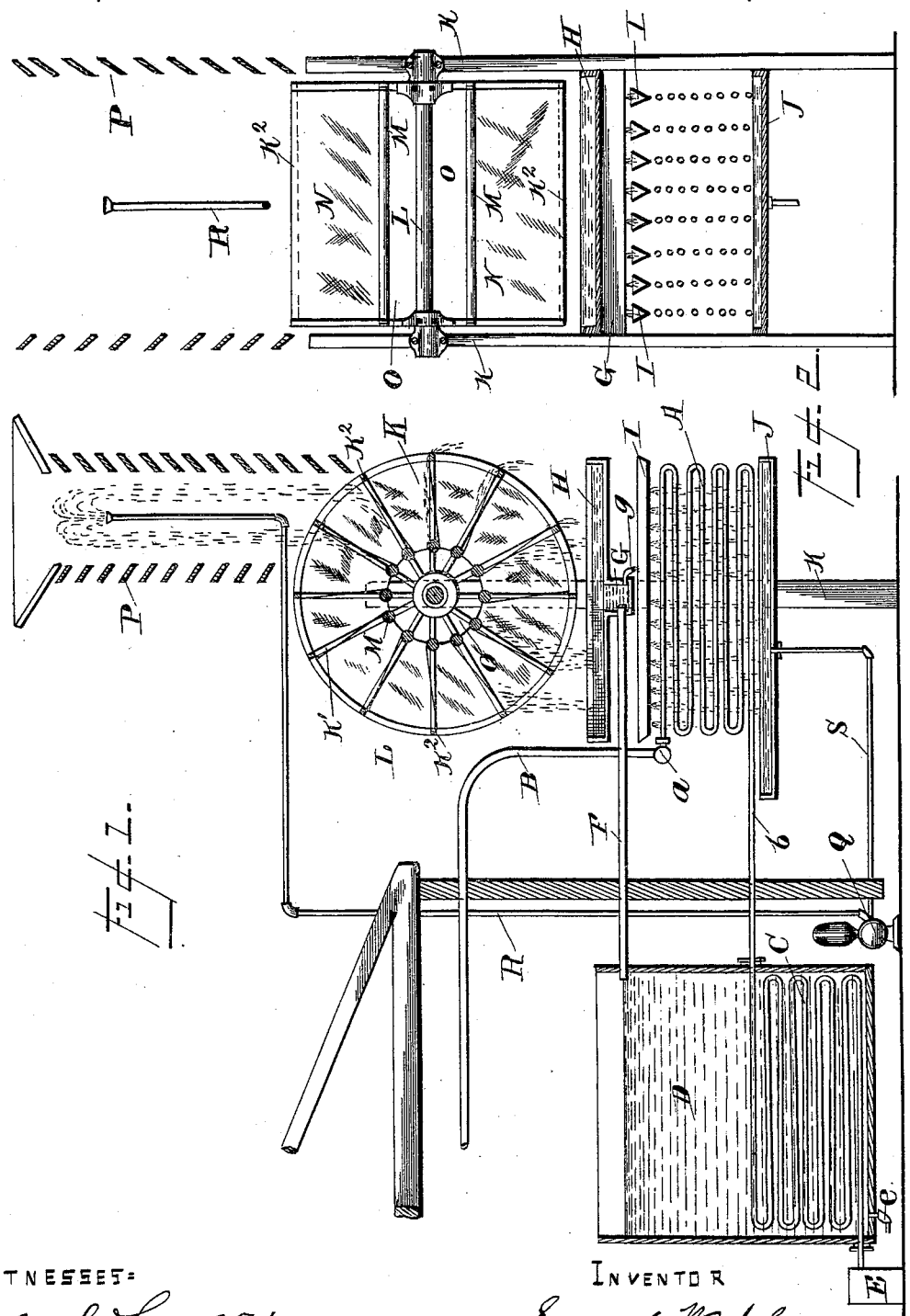

SAMUEL W. JOHNSON, OF NEWPORT NEWS, VIRGINIA.

CONDENSER.

SPECIFICATION forming part of Letters Patent No. 521,373, dated June 12, 1894.

Application filed November 9, 1893. Serial No. 490,461. (No model.)

*To all whom it may concern:*

Be it known that I, SAMUEL W. JOHNSON, a citizen of the United States, residing at Newport News, in the county of Warwick and State of Virginia, have invented certain new and useful Improvements in Condensers; and I do hereby declare the following to be a full, clear, and exact description of the invention, such as will enable others skilled in the art to which it appertains to make and use the same.

This invention relates to certain improvements in condensers for the condensation of gas, steam, &c., but most particularly to that part of the process of liquefying gas, in which water is applied to the outside of the pipes containing the gas for reducing the temperature, so that the gas can be liquefied at a lower pressure.

The objects of the invention are—first, to provide for the rapid and economical removal of the heat absorbed by the condensing water, used in cooling the gas or steam, whereby the same water can be used over and over until it becomes wholly evaporated, thus producing a maximum cooling effect with a minimum quantity of water; second, to provide means by which the water may be exposed to a strong current of air, whereby rapid evaporation is insured; third, to provide a simple and inexpensive means by which the weight of the water to be cooled is caused to furnish the power necessary to perform the work required in cooling the water, and, fourth, to provide, in addition to the usual condensing apparatus, a cooling-coil, which shall be so situated that the water used on the condenser and also the water that has been used over and recooled several times, but too warm to use on the condenser, shall be caused to flow over said cooling-coil.

With these objects in view the invention consists in the novel construction and arrangement of the various parts, as will be hereinafter more fully described, and specifically pointed out in the claims.

In the accompanying drawings: Figure 1 represents a side elevation, partly in section of my improved condensing apparatus, as applied to the condensation of ammonia gas in ice-making machines, and Fig. 2, a vertical section, on line $y, y$, of Fig. 1.

Referring to the drawings, in which similar letters of reference indicate similar parts throughout the several views,—the letter A indicates a series of open-air cooling-coils which are connected by a coupling, $a$, to a supply-pipe, B, through which ammonia or other refrigerating-gas is supplied to the cooling-coils, and by a pipe $b$ to the condensing-coils C, as shown in Fig. 1. The condensing-coils are situated within a water-tank, D, on a lower level than the cooling-coils, and are connected with a receiver, E, into which the liquid gas is fed by gravity as fast as it becomes condensed in the condensing-coils. The water-tank is supplied with cool water through a pipe, $e$, leading from any suitable supply, and is provided with an overflow-pipe, F, which has its outlet in a trough, G, made in the bottom of a drip-pan, H, located above the cooling-coils. The said trough is provided with a series of short overflow-pipes, $g$, through which the overflow water is conducted to a series of perforated troughs, I, located beneath said drip-pan, H; thus it will be seen that the overflow water from the tank is conducted through pipe F to the trough G and thence to the series of troughs I, from which it is distributed, through the perforations in said troughs, over the cooling-coils and is received into a drip-pan, J, situated beneath said coils.

It is the common practice after using condensing-water once to allow it to run to waste, but one of the principal objects of my invention is to remove the heat from the water and use it over again. This object is accomplished in the following manner:

The letter K indicates a paddle-wheel mounted rigidly on a shaft L, journaled in suitable bearings on standards or posts $k$, and has its spokes or arms $k'$ connected at their outer ends by longitudinal rods $k^2$. Rollers M are journaled between said spokes, and from each roller and rod is stretched a sheet, N, of Turkish cloth, felt, or other suitable material capable of absorbing water, said sheets forming the paddles of the wheel. The sides of each end of said wheel are covered with tin, or other suitable material, with the exception of a space, O, in the center, which is equal to or about one third of the diameter of said wheel. The sheets of cloth or felt are maintained moderately tight by means of ratchets and pawls (not shown) at the ends of the rollers M.

The letter P indicates a tower having its four sides provided with slats, as shown in the drawings. Leading from the pump, Q, is a stand pipe, R, which enters the tower, at or near its bottom, and extends upward some distance into the same, the said pipe being provided with a spray-nozzle. The operation of this device is as follows:—The warm water collected in the drip-pan J, is fed to the pump Q by a pipe S, and by said pump is forced through the pipe R and its nozzle in a spray in the upper part of the tower, and in falling said water strikes upon the cloth or felt paddles, at one side of the wheel, causing said wheel partly from the force with which the water strikes said paddles and partly from its own weight, to rotate, thereby causing a current of air to circulate through the open spaces O and between the paddles of felt or cloth, the moist air in the wheel being driven out by centrifugal force and replaced by dry air sucked in through said open spaces, and the draft thus created rapidly causes the evaporation of the water absorbed by the paddles of cloth or felt and reduces the temperature, partly by contact with the air and partly by the heat absorbed by the water in changing to vapor.

It will be understood that the paddles of cloth or felt absorb about four times the quantity of water that they receive during any one revolution, and the warm water from the tower striking upon said paddles with considerable force drives the cooled water out on the under side thereof, and dripping from the ends falls into the pan H, from which it passes into the troughs I, and from thence over the cooling-coils down into the pan J. It will also be understood that as water, in its natural state, is nearly always much cooler than air, it would be impossible after it was once heated to reduce it to its initial temperature without either a great expenditure of power to force evaporation, or exposing it for a long time to the action of the air,—neither of which would be economical. But by exposing the incoming gas in the cooling-coils, which gas is always at a high temperature, to the water after it has been used on the condenser, and also to the water which has been used over several times and recooled—but still too warm to use on the condensing-coil—the liquefied gas in the receiver is reduced to the lowest possible temperature and pressure, a result that would be impossible to attain without the preliminary work of the cooling-coils operated upon by a water-cooling system entirely distinct and separate from that employed upon the condensing-coils.

While I show and describe the cooling-coils in connection with my system of removing the heat from the water used to cool the condensing-coil, and cooling and reusing the same until wholly evaporated, I do not broadly claim herein such coils, as I intend to make them the subject-matter of a future application.

Having thus fully described my invention, what I claim as new, and desire to secure by Letters Patent, is—

1. The herein described method or system of utilizing waste condensing-water, in a condensing-apparatus, to further condense the fluid in the pipes, the same consisting in first conveying said water to a suitable distributing-receptacle or vessel; then distributing it in showers or small columns over the liquid cooling-coils into a second vessel or receptacle, then conducting it to a pump and forcing it to a suitable height and spraying it into the first mentioned receptacle, there to have the operation repeated.

2. The herein described method or system of utilizing waste condensing-water, in a condensing-apparatus, to further condense the fluid contained in the pipes, the same consisting in first conveying said water to a suitable distributing-vessel; then distributing it in showers or small columns over the liquid cooling-coils into a second vessel; then conducting it to a pump and forcing it to a suitable height, from which it falls in sprays, and finally subjecting the sprayed water to a current of air before it falls into the first mentioned vessel.

3. The herein described method or system of utilizing waste condensing-water, in a condensing-apparatus, to further condense the fluid contained in the pipes, the same consisting in first conducting the said water to a suitable vessel; then distributing it in showers or columns over the liquid cooling coils into a second vessel; then conducting it to a pump and forcing it to a suitable height; then spraying it upon revolving sheets of absorbent material, and finally, subjecting the water to currents of air.

4. In a condensing-apparatus, the combination, with a water-supply pipe, of a wheel having paddles of absorbent material, and a slotted tower to protect the water from winds and direct it upon said paddles, substantially as specified.

5. In a condensing-apparatus, the combination, with a water-supply pipe, of a wheel having paddles of absorbent material, a slotted tower for protecting the water from the wind, and a vessel for receiving said water and distributing it over a series of cooling-coils containing the fluid to be cooled, substantially as specified.

6. In a system of utilizing the waste condensing-water in a condensing-apparatus, the combination with the water supply pipe, of a suitable receiving and distributing vessel, a drip pan, a pump for forcing the water through a pipe, a slatted tower in which the open end of said pipe is situated, and a wheel having paddles of absorbent material, substantially as specified.

7. The combination, with a condensing-apparatus, and a water-supply pipe, of a receiving and distributing-vessel, a drip pan situated beneath the first mentioned vessel and connected with a pump, a pump for forcing the water through a pipe leading to a slatted tower, the tower inclosing the open end of said pipe, and a nozzle attached to the pipe for spraying said water, substantially as specified.

In testimony whereof I affix my signature in the presence of two witnesses.

SAMUEL W. JOHNSON.

Witnesses:
   J. R. NOTTINGHAM,
   E. A. PAUL.